April 10, 1951          H. Z. GORA          2,548,306

METHOD AND APPARATUS FOR MOLDING ARTICLES

Filed Jan. 19, 1946          7 Sheets-Sheet 1

Fig. 1

INVENTOR
Henry Z. Gora
BY
ATTORNEYS

April 10, 1951   H. Z. GORA   2,548,306
METHOD AND APPARATUS FOR MOLDING ARTICLES
Filed Jan. 19, 1946   7 Sheets-Sheet 2

INVENTOR
Henry Z. Gora
BY Johnson, Kline and Hensel
ATTORNEYS

INVENTOR
Henry Z. Gora
BY Johnson, Kline and Hensel
ATTORNEYS

April 10, 1951  H. Z. GORA  2,548,306
METHOD AND APPARATUS FOR MOLDING ARTICLES
Filed Jan. 19, 1946  7 Sheets-Sheet 5

INVENTOR
Henry Z. Gora.
BY
ATTORNEYS

April 10, 1951     H. Z. GORA     2,548,306
METHOD AND APPARATUS FOR MOLDING ARTICLES
Filed Jan. 19, 1946     7 Sheets-Sheet 7

INVENTOR
*Henry Z. Gora*
BY
ATTORNEYS

Patented Apr. 10, 1951

2,548,306

UNITED STATES PATENT OFFICE 2,548,306

METHOD AND APPARATUS FOR MOLDING ARTICLES

Henry Z. Gora, Stratford, Conn., assignor, by direct and mesne assignments, to The Gora-Lee Corporation, Bridgeport, Conn., a corporation of Connecticut Application January 19, 1946, Serial No. 642,193

17 Claims. (Cl. 18—5)

This invention relates to improvements in methods for making articles of thermoplastic material, especially articles of rubber or of rubber-like nature, and to apparatus therefor.

In the molding of articles of thermoplastic material, it has heretofore been the common practice, especially when the articles were rather small, to make a two-part, separable multi-cavity mold, there frequently being as many as a hundred cavities in a mold, and charge the mold by superposing upon one part a calendered strip of moldable material. The two parts of the mold were then brought together so that the material from the calendered strip was squeezed in the cavities, leaving the unutilized portion of the material which was located between the cavities in the form of a web. The mold was then subjected to heat and pressure, and completely closed for an appreciable length of time so as to cure the material or vulcanize it if it is rubber-like. In some cases the mold was kept closed as long as twenty minutes. After the curing, the mold was opened, and the unit comprising the molded pieces and the scrap to which they adhered was stripped from the mold. The pieces were then separated from the scrap by rumbling, which had to be continued for a substantial length of time.

By these known prior methods the production of small molded pieces was costly considering their ultimate worth, and it is to reduce the cost of producing such pieces and other pieces required in larger quantities and increase the speed with which they may be produced and finished that the present invention is primarily concerned.

The problems of producing small molded pieces by prior methods became aggravated when the rubber pieces were to be inserts in, or were to receive inserts of other material such as metal, for in such a situation the multi-cavity mold had to be charged with the inserts, or the pieces to receive the rubber or other plastic material.

According to the present invention great and important savings are effected by molding and curing the pieces by a separate operation for, as will be apparent below, the speed of operation of the molding machine or process is not limited by the time required for curing. Moreover, instead of attempting to mold relatively small pieces of thermoplastic material in a two-part separable multi-cavity mold where many pieces are molded simultaneously, the pieces are molded according to the present invention consecutively and by a continuous process. Depending upon the size and capacity of the machine, one or several pieces may be molded at a time by duplicate mechanisms. Further, according to the present invention, at the time that the pieces are molded they may be united with metal parts with which they are to become one, if such is necessary.

In addition to a saving of time, thus obtaining greater production within a given time, the present invention also effects a great and important saving in the material used. In fact, the process of the present invention is such, and the apparatus is so organized, that virtually all of the material fed to the machine becomes useful product.

This application is a continuation in part of my co-pending applications Serial No. 574,555, filed January 25, 1945; Serial No. 590,459, filed April 26, 1945; and Serial No. 607,226, filed July 26, 1945, wherein are disclosed specific and related methods and means for forming and applying gasket members to the undersides of caps or lids.

Briefly and more specifically the present invention provides for the continuous molding of pieces of thermoplastic material by providing co-operating die elements on adjacent drums, and passing the moldable material between the drums so that the material will be squeezed into the molds and formed into shaped pieces as the drums rotate, the pieces being ejected from the die elements after the drum carrying them passes the molding station. The formed and molded pieces of uncured material are then placed on a suitable support or carrier to receive application of heat for a sufficiently long time to harden or cure them, the length of time depending upon the size of the pieces and the accelerator used in the rubber-like material. However, I have found that pieces so molded may be conveniently fed onto a conveyor belt and passed through a tunnel or chamber where they are subjected to heat rays emanating from so-called infra-red lamps, and the speed of travel of the conveyor may be such as to cause the pieces to be completely efficiently cured and vulcanized by the time they reach the end of the tunnel. There is thus provided by the present invention a means whereby molded articles of rubber or rubber-like material may be molded at one station and at an economical and desirable speed, and vulcanized in another station for the proper length of time, neither treatment retarding the other.

The thermoplastic material which is fed between the die-carrying drums according to the present invention is brought to the desired degree of plasticity in a warming mill forming part of the apparatus, and in fact preferably supported on the same frame as the die-carrying drums.

Material is fed to the mill rollers in bulk form, having been previously properly mixed in a mixing mill or otherwise prepared, and when it has been worked to the desired degree of plasticity in the warming mill, a strip or band of the material is cut and stripped from the hotter roller and passed between the drums carrying the dies so that the latter when brought together squeeze desired quantities of the plastic band between the dies to form the pieces. The band or strip of moldable material is preferably of such width that after the quantities of material required to make the pieces are removed from it, it remains in strip form so that it may be led or fed back into the mill and thus not be wasted. The strip of moldable material is removed from the mill preferably from a place near one end, called the delivery end, of the hotter mill roller, and the length of the mill rollers is such, considering the speed of operation of the molding drum, the volume of the material involved in each piece and the degree of plasticity desired before the pieces are molded, that the replenishing material introduced to the mill at the other or intake end of the hotter roller, will have been worked and will have been heated by the friction of working and the heat transmitted by the mill rollers, to the desired degree of plasticity by the time this material works over to the delivery end of the mill roller. The returned strip from which the quantities have been removed from molding the pieces, is introduced to the mill at the intake end of the rollers.

When metal inserts are to be molded in the articles, they may be placed in suitable sockets in one or the other of the die elements, in advance of the latter reaching the molding station, and this may be done by hand or by automatic hopper feed with which the art is familiar, the pieces in either case being in the dies when the rubber is received by the latter, so as to have the rubber mold around or onto them to form unitary pieces.

The present invention is particularly important and advantageous in connection with the provision of molded rubber-like washers in metal caps, for when this is to be done the washer or gasket can be molded at the molding station, carried around by the die to an assembly station, and there inserted in and adhered to a cap structure, the assembly being discharged from the molding machine and then subjected to curing or vulcanizing treatment as above mentioned, for instance by heat generated by infra-red lamps.

When pieces having re-entrant external angles or peripheral grooves are to be made, the die elements may include auxiliary parts such as slides to form such grooves, and the slides may be retracted to permit free discharge of the articles from the mold without distortion. Thus, according to the present invention there may be economically and satisfactorily made, rubber entrance bushings commonly called grommets, which are used extensively to protect wires extending through metal or other walls.

Other features and advantages will hereinafter appear.

Figure 1:
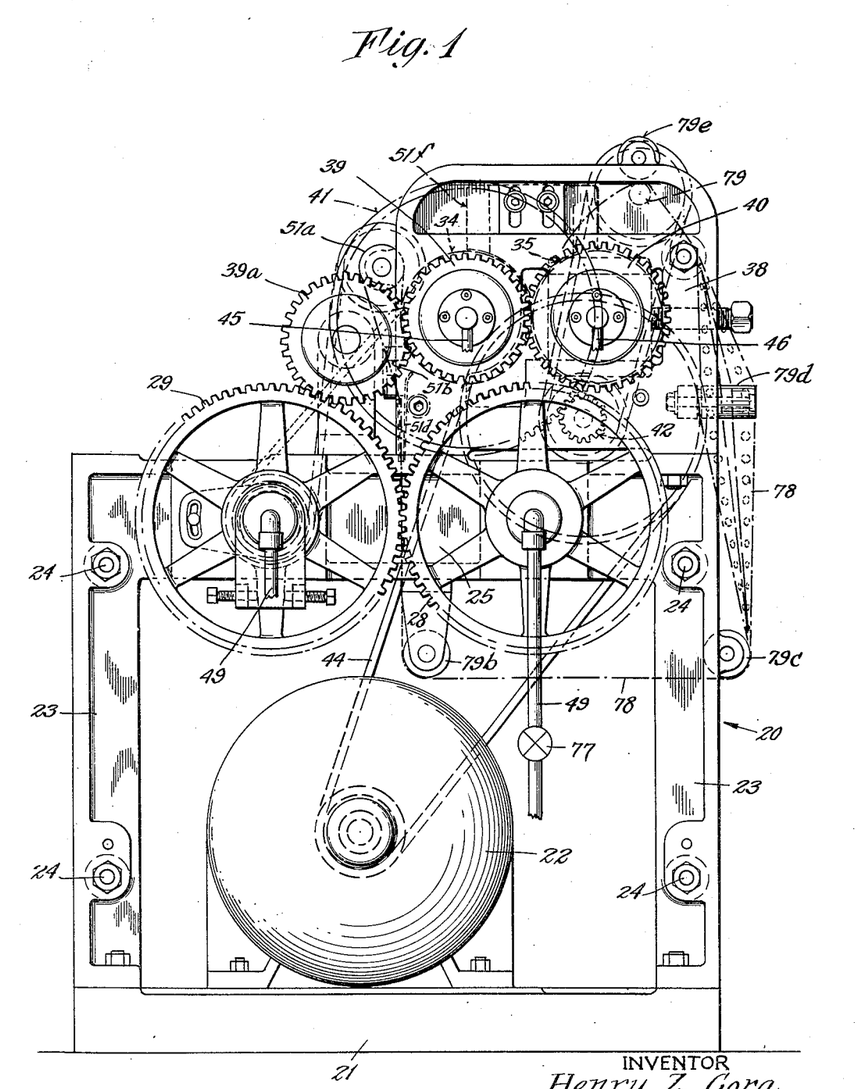
Figure 1 is a side elevation of one machine made according to the invention, for molding small articles such as rubber buttons, with or without metal inserts, and for molding grommets.
Figure 2:
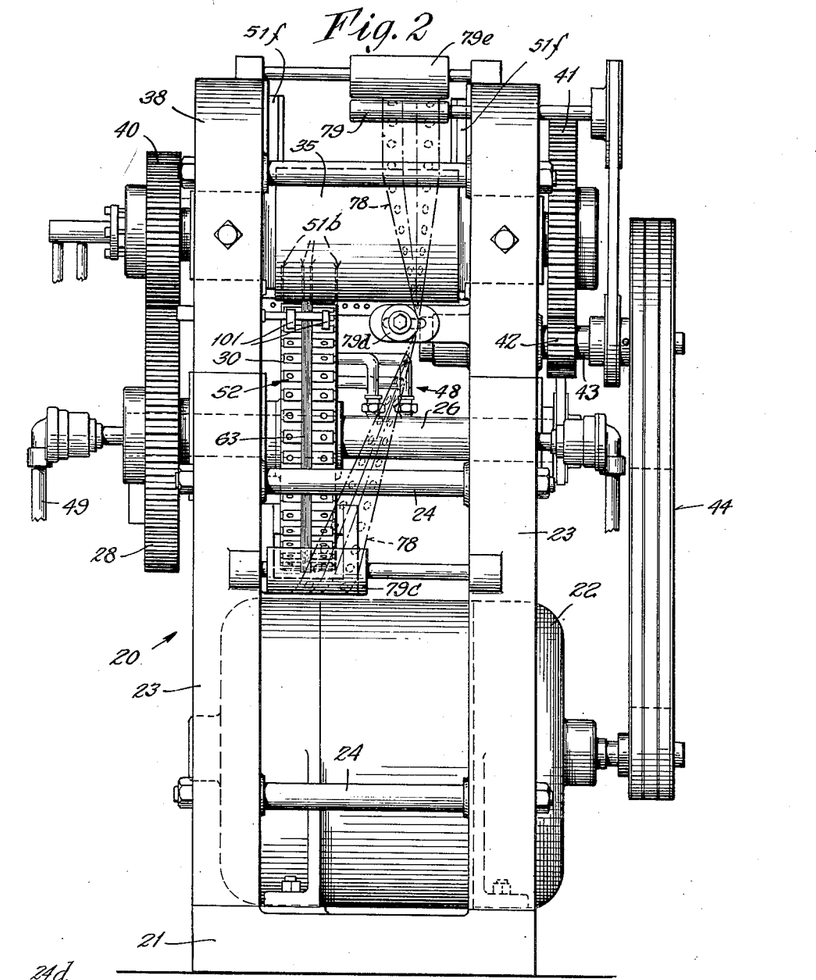
Fig. 2 is a rear elevation of the machine of Fig. 1.
Figure 3:
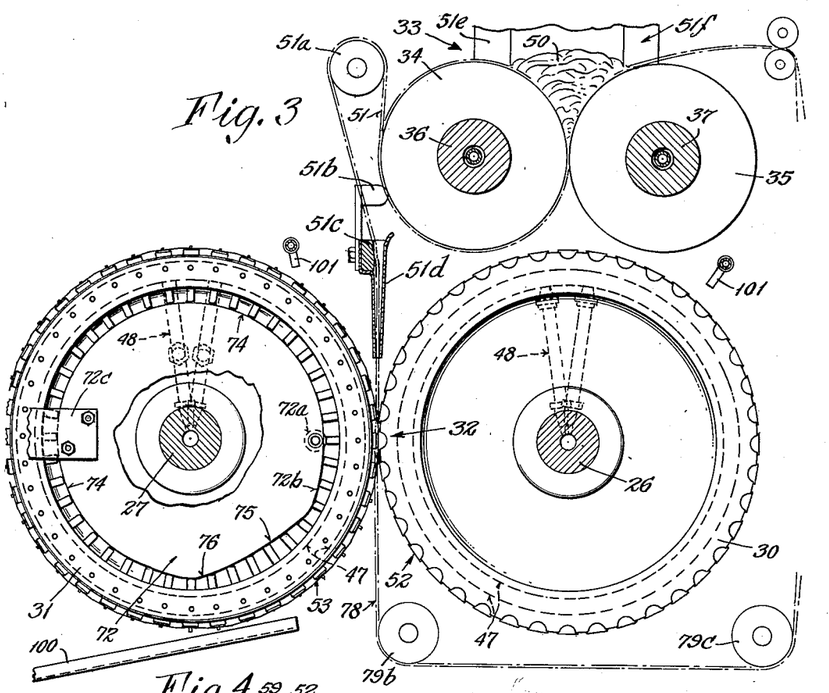
Fig. 3 is a side view of several of the operating parts of the machine.

Referring to Figs. 1, 2 and 3, my machine comprises a frame 20 on a base 21 supporting an electrical motor 22, uprights 23 secured in position by tie rods 24, and horizontal members 25 in which are journaled shafts 26 and 27 having meshing spur gears 28 and 29.

The shaft 26 carries a cylindrical drum or die carrier 30, Fig. 3, and the shaft 27 carries a drum or die carrier 31. The drums 30 and 31 have substantially the same diameter, and are located on parallel axes with their peripheries extending closely adjacent at a point 32.

Above the drum 30 there is a warming mill 33 including heat-controlled rollers 34 and 35 mounted on shafts 36 and 37 respectively, journaled in vertical extensions 38 of the frame 20. The rollers 34 and 35 are geared together by smaller and larger spur gears 39 and 40 mounted on the shafts 36 and 37 respectively, so that the roller 34 rotates faster than the roller 35. The shaft 36 also has a spur gear 41 mounted thereon, Figs. 1 and 2, engaging a pinion 42 carried by a jack shaft 43 which is driven through a belt and pulley drive 44 from the motor 22.

Figure 5:
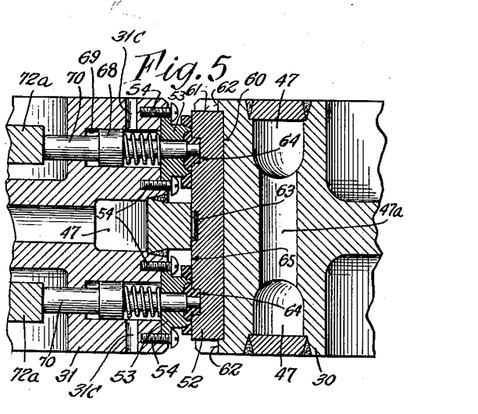
Fig. 5 is a section taken on the line 5—5 of Fig. 4.

The spur gear 39 drives an idler gear 39a which meshes with gear 29, so that the drums 30 and 31 and the rollers 34 and 35 of the warming mill 33 rotate in synchronism, and the ratio of the gearing is such that the peripheral speeds of the drums 30 and 31 and roller 34 are the same. The rollers 34 and 35 may be heated or cooled by passing steam or cooling fluid through shafts 36 and 37 which are hollow for this purpose, these shafts being connected by suitable fittings to supply pipes 45 and 46. Also, the peripheries of the drums 30 and 31, Figs. 3 and 5 have annular channels 47 and interconnecting passages 47a so that heating or cooling fluids may be fed thereto from pipes 48 connected with the shafts 26 and 27, which latter are bored and coupled by suitable fittings with supply pipes 49.

According to the present invention the material which is to be molded into the desired articles is deposited in the trough formed between the rollers 34 and 35 of the warming mill, and a sufficient quantity 50 of the moldable material which, for instance, may be of uncured rubber or rubber-like material or other thermoplastic material, is kept in the mill so that this may be worked and heated to the desired degree of plasticity, the rollers 34 and 35 being so spaced that a predetermined quantity of the material is built up as a complete layer on the hotter roller 34. When the moldable material 50 has been brought to the desired degree of plasticity, a continuous strip 51 thereof is peeled or stripped from the roller 34 and ultimately fed between the drums 30 and 31. As shown, the strip 51 is first passed over a roller 51a which is power driven and aids in drawing the strip of moldable plastic material from the roller 34. The strip 51 is cut from the layer of material on the roller 34 by a pair of knives 51b engaging the drum 34 and carried by a cross bar 51c, and these knives may be secured to the bar at different locations so that the space between them, and therefore the width of the strip 51 may be varied.

Preferably the strip 51 is cut from the material on the roller 34 near one end of the roller, and the quantity of new material which is added from time to time is fed to the milling rollers at the other ends thereof so that as the material is worked it moves across from the intake ends of the rollers to the ends from which the strip 51 is cut. The uneven edge of the layer of material at the end of the roller 34 adjacent the knives is preferably deflected toward the center of the machine, so that it may commingle with the quantity of material 50 between the intake ends of the rollers and the knives, and be used up subsequently as part of the continuous strip 51. This is accomplished by the provision of a cam surface 51e on the adjacent one of the plates 51f which closes the end of the trough between the rollers. A similar cam surface 51e may be provided at the intake end of the roller 34 to deflect inward the uneven edge of the layer of rubber on the said roller.

After the strip 51 leaves the roller 51a it passes downwardly through an elongated, tapered, flat, tubular guide 51d for the purpose of more accurately guiding the strip to a point immediately above the bight of the drums 30 and 31, substantially tangentially to both drums.

The peripheries of the drums 30 and 31 are provided with sets of die elements 52 and 53 respectively, which are adapted to sequentially cooperate at the point of adjacency 32 of the drums as the latter rotate, for the purpose of blanking and molding the material of the continuous strip 51. The die elements 52 and 53 are shaped to cut predetermined quantities or blanks from the strip 51 and in some cases to simultaneously mold said blanks to the desired shape, for instance, the buttons 55 shown in Fig. 11 without excess material being left over from the blanks. The die elements 53 may be rigidly secured to the periphery of the drum 31 by screws 54, and may be mounted in multiple groups around the drum 31. Each element 53 has a centrally bored body and concave molding surfaces 57, and flanges 58 for engagement with the heads of the screws 54. The elements 53 may also have circular cutting or blanking edges 59 bordering the molding surfaces 57, the edges being preferably slightly flat.

The die elements 52 carried by the drum 30 are preferably mounted so as to be tiltable slightly on an axis parallel to the axes of the drums to enable them to become parallel with the elements 53 for coaction just prior, upon and subsequent to the elements reaching the point 32, which constitutes a molding station.

Hence, the periphery of the drum 30 is provided with a plurality of transversely extending semi-cylindrical grooves 60, and the back 61 of each of the die elements 52 is semi-cylindrical in shape to nest within and rotate on the surface of a groove 60. The grooves 60 have shoulders 62 at their ends, for engaging the end of the elements 52 to prevent endwise movement thereof. The die elements 52 are retained on the periphery of the drum 30 by means of a wire 63 wrapped around the drum and located in grooves 52a in the elements 52.

The grooves 52a are slightly rounded transversely of the die elements 52 so that the latter are free to rock, but cannot move bodily out of the cylindrical sockets 60.

Each of the die elements 52 has a pair of recesses or cavities 64 adapted to align and cooperate with the cavity or molding surfaces 57 of the pairs of die elements 53. As shown the recesses 64 are of smaller diameter than the recesses in the die elements 53, and therefore the outer flat surfaces 65 of the elements 52 may engage and cooperate with the blunt cutting edges 59 of the elements 53, for the purpose of cutting or squeezing blanks from the strip of material 51 being molded.

For the purpose of molding the articles with central recesses or apertures such as the buttons 55, the die elements 53 are provided with core pins in the form of plungers 67 having shanks 67a extending through central apertures in the elements, the shanks having a diameter and shoulder at their ends to produce the desired cavity in the button 55. The pins 67 have enlarged bodies 68 which are slidably carried in radially extending, shouldered apertures 69 provided in the drum, and secured to the bodies 68 are inwardly directed shanks 70 which project through and beyond the inner periphery of the drum 31. The pins 67 are urged to retracted positions by springs 71 which engage the bodies 68 and the undersurfaces of the die elements 53.

Figure 4:
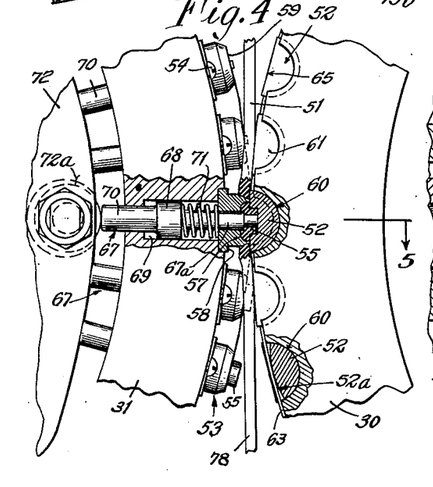
Fig. 4 is a fragmentary enlargement, partly in section and partly in elevation, of adjacent portions of the blanking and molding drums.

The core pins 67 are automatically caused to move outwardly and return as they approach and leave the molding station 32, and again project for the purpose of ejecting the molded buttons 55 by a cam mechanism 72 located within the drum 31 and in a position to be engaged by the inner ends 70 of the core pins. The cam 72 normally has a circular or concentric portion 74 holding the pins partially projected and motionless. When each pin and its accompanying die element 53 reach the molding station 32 the pin is engaged by a roller 72a which projects the pin to its full extent, and causes the outer extremity to engage the bottom of the cavity of an aligned die element 52. As shown in Fig. 4, the roller 72a is eccentrically mounted so that the amount which the pins are projected may be varied to suit the particular needs of the machine. As each core pin 67 leaves the molding station 32 it again recedes slightly, and this causes it to be partially stripped from the material which has been molded around it, to form the article or product. As the drum 31 continues and the pin progresses, the latter rides up an incline 72b which partially projects the pin again to loosen the molded article from the cavity of the die element 53. When the pin progresses still further, it again recedes due to the declining cam surface 75, and this again loosens the pin from the material which is molded around it. Finally the pin rides up an incline 76 and is again projected to a point where the molded piece is forced from the die cavity and falls onto a chute 100. The pin now remains on the concentric portion 74 of the cam 72 until it again reaches the molding station 32.

Preferably, according to the invention, the cam 72 is so mounted that it provides a yielding pressure on the core pins 67, thereby obviating the necessity of having the core pins, die elements and drums held to exceedingly accurate and small tolerances. In accomplishing this, the cam 72 has a slight amount of clearance in its bearing on the shaft 27. This clearance may be very small, in the order of .005″ to .010″. Also, the cam 72 has a bifurcated extension 72c, Figs. 3 and 26, which straddles one of the tie rods 24 of the machine, the said tie rod having a screw 24a engaging a cup 24b which carries a helical expansion spring 24c in turn engaging the cam extension 72c. By this arrangement the cam 72 and roller 72a, referring to Fig. 3, are yieldably urged toward the right, tending to project the roller 72a further than is necessary to completely advance each of the core pins 67. Thus, as each core pin moves into engagement with the roller 72a the pin will be first advanced so that the reduced tip portion thereof fully engages the associated die element 52, thereby preventing any of the moldable material from the strip 51 from existing between the core pin tip and die element. As the drums continue their rotation and the molding station 32 is reached the roller 72a and the cam 72 will be moved slightly to the left, looking at Fig. 1, as made possible by the clearance in the bearing between the cam and the shaft 27, the said movement compressing the spring 24c slightly. As the core pin 67 leaves the molding station 32 subsequent to molding of the article, the spring 24c will again shift the cam 72 and roller 72a to the right, and the sequence of operations will be repeated upon the next core pin passing the molding station. Thus, during the operation of the machine the cam 72 and roller 72a carried thereby will have a very slight horizontal reciprocating movement.

Figure 26:
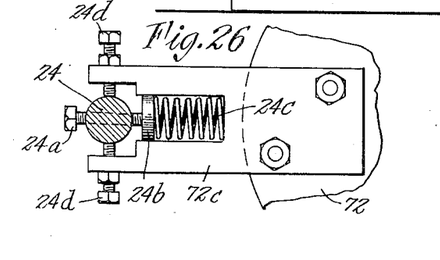
Fig. 26 is a detail of the anchored end of a cam associated with one of the blanking and molding drums.

Provision is made for slight rotary adjustment of the cam 72 by use of adjusting screws 24d which are carried by the bifurcated portion 72c of the cam, and which bear against the tie rod 24 as shown in Fig. 26.

During operation of the machine and molding of the buttons 55, minute quantities of material from the strip 51 may escape past the portions 67a of the pins, into the area occupied by the springs 71. To enable this material to be discharged without interfering with the machine operation, discharge openings 31c are provided in the drum 31, Fig. 5.

The quantity of material in the blanks cut from the continuous strip 51 is sufficient to completely fill the cavities formed between aligned die elements 52, 53 when the core pins 67 are advanced into the said cavities. Thus, the blanks of plasticized material are molded to the exact shape of such cavities, this molding being facilitated by the heat of the die elements, received by conduction from the peripheries of the drums 30 and 31.

Since one of the drums is maintained at a higher temperature than the other, the drum 31 being the hotter as shown, the molded pieces 55 remain in the die elements 53 after the cooperating elements separate upon leaving the molding station 32. This differential heating or cooling of the drums may be accomplished in any suitable manner, as for instance by regulating a throttling valve 77 in the supply line 49 for the drum 30.

In order to facilitate the flow of the material over the surfaces of the die elements in filling the cavities thereof and to keep the molded pieces 55 from becoming so stuck to the die elements 53 and core pins 67 that they could not be readily removed, and also to avoid the sticking of the pieces to the die elements 52, both sets of die elements are moistened with a suitable molding lubricant escaping slowly through nozzles 101, as they approach the molding station 32.

Due to the projected portions of the core pins located in the die elements 53, the molded pieces 55 are temporarily retained in the elements only until the pins are retracted and again projected, for as soon as each core pin is retracted from its molded piece, the cavity thereof contacts and upon the next outward movement of the pin an outward impetus is given to the molded piece which causes it to be dislodged from the die 53 and fall onto the collecting chute 100.

If it is found that in the material being used there is appreciable cumulative elongation of the strip between the milling roller 34 and the drums 30 and 31 the ratio of the gearing of the diameter of the roller 34 may be changed to make the speed of the milling roller slightly less than that of the drums.

Figure 23:
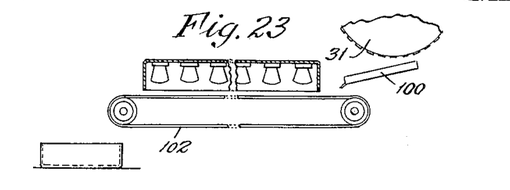
Fig. 23 is a diagrammatic representation showing the discharge chute, discharge conveyor and curing oven for the machine of Figs. 1 and 15.

According to the present invention in its form at present preferred, when the moldable material is of a curable nature, such as synthetic rubber, the process is so carried out that no curing of the molded piece is effected while it remains in the die. Rather, the molded pieces are ejected from the die elements as above explained, and then subsequently vulcanized or cured. In this way the operation of molding or forming is not retarded by the necessarily longer operation of curing, and according to the broader aspects of this invention, this curing may be accomplished in any suitable way or at any place. However, I have found it extremely advantageous and economical to continue the processing of the molded pieces immediately, and for this purpose I have provided, as diagrammatically shown in Fig. 23, a conveyor 102 which receives the pieces from the collecting chute 100 and carries them through a tunnel under a bank of infra-red lamps, the direct and reflected heat from which cures the pieces. At the end of the tunnel the cured pieces drop from the conveyor into suitable receptacles. The speed with which the conveyor moves and the length of the tunnel controls the length of time that the pieces are cured. The temperature is controlled by the number and wattage of the infra-red lamps used in the tunnel. In this way the pieces are molded and cured without manual handling, and it is noteworthy that it is not necessary to separate the molded pieces from each other, or to place them in any prearranged positions on the conveyor, for I have found that as these pieces fall out to the conveyor at random, they may be so vulcanized, even though they are at some places superposed upon each other. Thus by the present invention there has been provided a manner of curing vulcanized rubber or rubber-like articles outside of the mold by which they are formed, and the great amount of machine time heretofore lost because of the necessarily long vulcanizing time has been saved.

In addition to saving machine time as above pointed out, the present invention virtually eliminates loss of material which would otherwise be scrap. This is accomplished by returning the skeletonized portion 78 of the continuous strip 51 back to the warming mill in virtually the condition it was when it left the mill, i. e. uncured, and the arrangement is such that this blanked out strip is fed into the mill at the intake end thereof and commingles with the material being milled and being supplied as replenishment. This may be accomplished in any suitable way, but as illustrated herein the blanked out strip 78 passes over an idler roller 79b and another idler roller 79c whereby the strip is kept from contact with the drum 30, then over a transversely disposed idler roller 79d and thence over a power driven pull roller 79 with which it is kept engaged by a pressure roller 79e. From the pull roller 79 the skeletonized strip 78 is led into the mass of material 50 at the intake end of the milling rollers.

It will be understood of course that as the drums 30 and 31 revolve and the pieces 55 are formed, the blanked out strip 78 is carried back into the mill by a continuous process and is again plasticized in the mill and used for product.

In practicing the processes and using the apparatus disclosed herein, the composition from which the articles are molded is so constituted that the proper accelerator is employed considering the kind of work to be done, the conditions of heat and speed of the machine, and the time which may be conveniently allowed for curing and vulcanizing the blanked out pieces. Preferably, the accelerator selected is such that the strip of plasticized material which extends from the warming mill to the molding position and then back to the warming mill is not appreciably changed, that is to say, is not cured. Where slow machine speeds are used, composition having a slower accelerator may be employed, and of course the greater the speed of the machine the faster the accelerator which may be used.

Figures 10, 11, 12, 13:
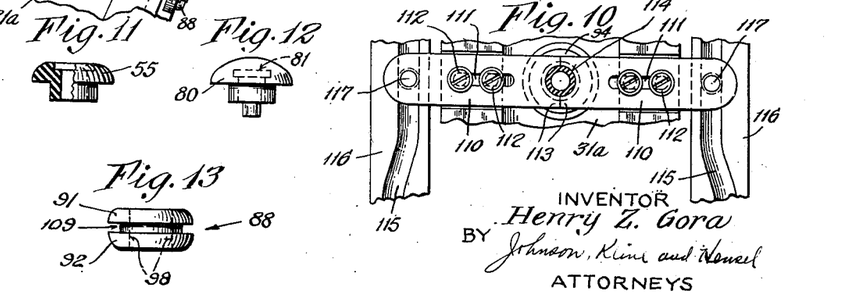
Fig. 10 is a fragmentary elevation of one of the drums showing the slides and means for retracting them.
Fig. 11 is a view partly in section and partly in elevation of a knob-like article such as a rubber garter button having a hole therethrough, made according to the invention.
Fig. 12 shows an article such as a garter button with stud or insert molded in the body, which may be made with the arrangement shown in Figs. 6 and 7.
Fig. 13 shows an article such as a grommet having an annular groove and a central hole which may be made with the arrangement shown in Figs. 8, 9 and 10.

When it is desired to mold button-shaped pieces such as the garter button 80 having a metal insert 81 as shown in Fig. 12, this may be accomplished by using different die elements and core pins associated therewith. To do this die elements 87 are provided with holes 86 forming sockets to receive and hold metal inserts 81 which are placed in the holes 86 before the elements 87 reach the molding station. Due to the heating of the drum 31, the inserts 81 are also heated by transmission from the die elements 87.

Figure 6:
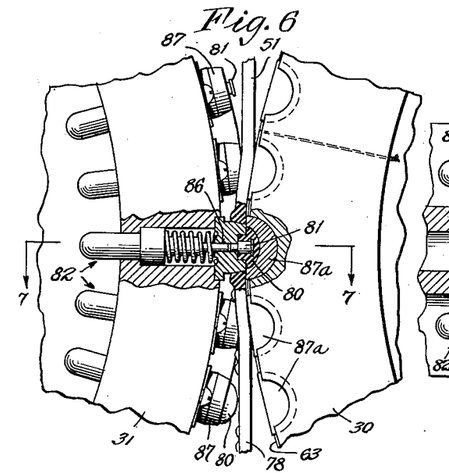
Fig. 6 is a fragmentary elevation partly in section and similar to Fig. 4 but showing the molding of a metal or other insert in the article being formed.

As the die elements 87 and 87a are brought together, with the moldable strip 51 interposed as shown in Fig. 6, a portion of the strip is blanked out, and confined in the aligning cavities of the elements surrounding the inserts 81 so as to be molded to shape around the inserts. As shown in Fig. 6, the cut-off or blanking edges of the die elements need not be sharp, it being sufficient that a narrow reduced outer surface of one of the elements 87 or 87a, engage the other under pressure to remove the desired quantity from the strip of molding material.

By virtue of this engagement the strip 51 of plastic moldable material will, where it exists between the engaging surfaces of the elements, be squeezed out as the said surfaces are brought together, and slugs or blanks of material trapped within the cavities of the elements will be formed under pressure around the metal insert to a shape as determined by said cavities.

Figure 7:
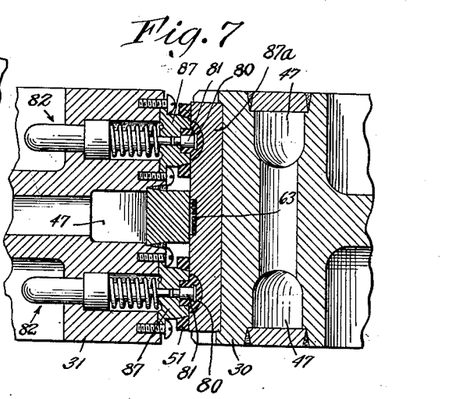
Fig. 7 is a section taken on the line 7—7 of Fig. 6.
Figure 8:
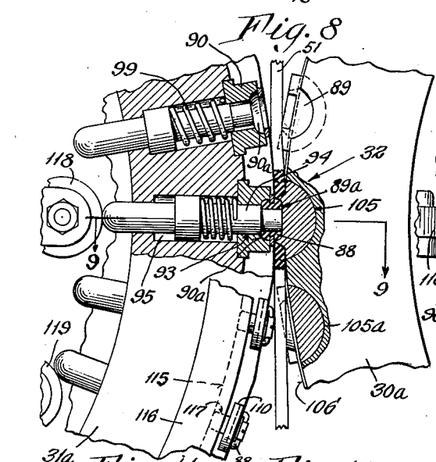
Fig. 8 is a view similar to Figs. 4 and 6 but showing the forming of an article having a narrow central portion and larger end portions, such as a grommet.

Mounted in the periphery of the drum 31, are spring-returned knock-out pins 82, Figs. 6 and 7, adapted to engage the ends of the metal inserts 81 and push the latter and molded buttons out of the die 87.

It will thus be seen that according to the present invention the time required to load a multicavity mold with metal inserts is saved, for as the drum 31 rotates the metal inserts may be placed in the cavities of the dies 87 by hand if the machine is operating slowly, or by a hopper feed if a greater speed of operation is practical, and this may be done without holding up the operation of the molding machine in any way.

According to this invention, as shown in Figs. 8, 9, 10 and 13, flanged articles such as the grommet 88 of Fig. 13 may be advantageously, economically molded.

In accomplishing this, drums 30a and 31a are provided, having cooperable die elements 89 and 90 respectively, said elements having cavities 89a and 90a shaped so as to form the outer surfaces of the flanges 91 and 92 of the grommets.

The die elements 90 have central bores 93 to receive core pins 94 which latter are slidably mounted in radial shouldered apertures 95 of the drum 31a. The die elements 90 have flanges 96 adapted to be engaged, and secured to the drum 31a by screws 97. The core pins 94 project through the cavities 90a of the die elements and have a diameter equal to the apertures 98 of the grommets 88, and said pins are yieldably urged by springs 99 to retracted positions as shown in the upper part of Fig. 8, these positions being occupied prior to the pins and die elements arriving at the molding station 32. The core pins 94 extend through and project from the inner peripheral surface of the drum 31a so that the pins may be conveniently actuated at predetermined rotative positions of the drum.

The die elements 89 carried by the drum 30a are tiltable, having convex backs 105 which occupy transverse grooves 105a in the periphery of the drum, said elements being retained by wires 106 extending around the drum. The grooves 105a of the drum have shoulders 108 at their ends engaging the ends of the die elements 89 and preventing endwise movement of the latter.

Figure 9:
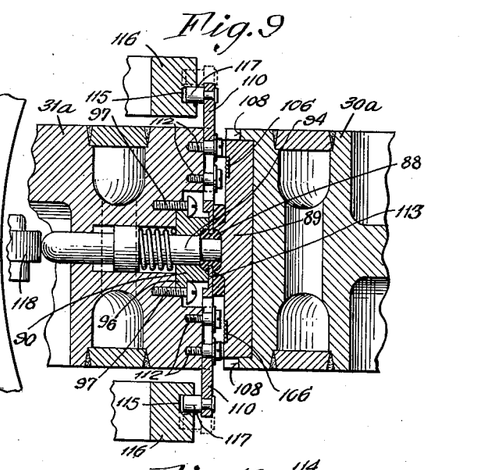
Fig. 9 is a section taken on the line 9—9 of Fig. 8 and showing retractible members or slides for forming the narrower portions of an article.

According to the invention the annular grooves 109 of the grommets are formed during the molding of the latter by pairs of slides 110 carried by the drum 31a, the slides having slots 111 accommodating screws 112 by which they are slidably mounted. The inner ends 113 of the slides are of reduced thickness, as shown in Fig. 9, and have semi-circular portions cut out so that when the slides are moved together a circular aperture 114 is formed between the ends. The shape and thickness of the ends 113 of the slides are such as to form the annular groove 109 in the grommet 88.

During rotation of the drums 30a and 31a the slides 110 are automatically actuated to advanced and retracted positions by means of cam tracks 115 in circular stationary cams 116 mounted on the frame 20 of the machine. The slides 110 at their outer ends have pins 117 which project into the tracks for engaging the walls of the latter, to be actuated thereby.

The cams 116 are so arranged that as the die elements 90 approach the molding station 32 the slides 110 are advanced toward each other, and reach the position shown in Fig. 10 prior to arrival at the station 32. Also, a roller 118 is provided, mounted on the frame 20 of the machine, for the purpose of advancing the core pins 94 as they reach the molding station. Thus, when a strip 51 of plastic moldable material is fed between the die elements 89 and 90 at the molding station 32, blanks will be cut from the strip and molded between the elements and around the core pins 94 and ends 113 of the slides so as to form the grommets 88. After the molding and as the drums 30a and 31a continue to rotate, the core pins 94 will in leaving the roller 118 be retracted by the springs 99, and the slides 110 will be moved apart by the tracks 115, thereby disengaging the ends 113 of the slides from the grommets 88.

As the drums continue to rotate further, the core pins 94 will be engaged by a second roller 119 which will again advance them and eject the grommets from the cavities 90a of the die elements, as in the structure of Figs. 1 through 5.

Figures 14, 15:
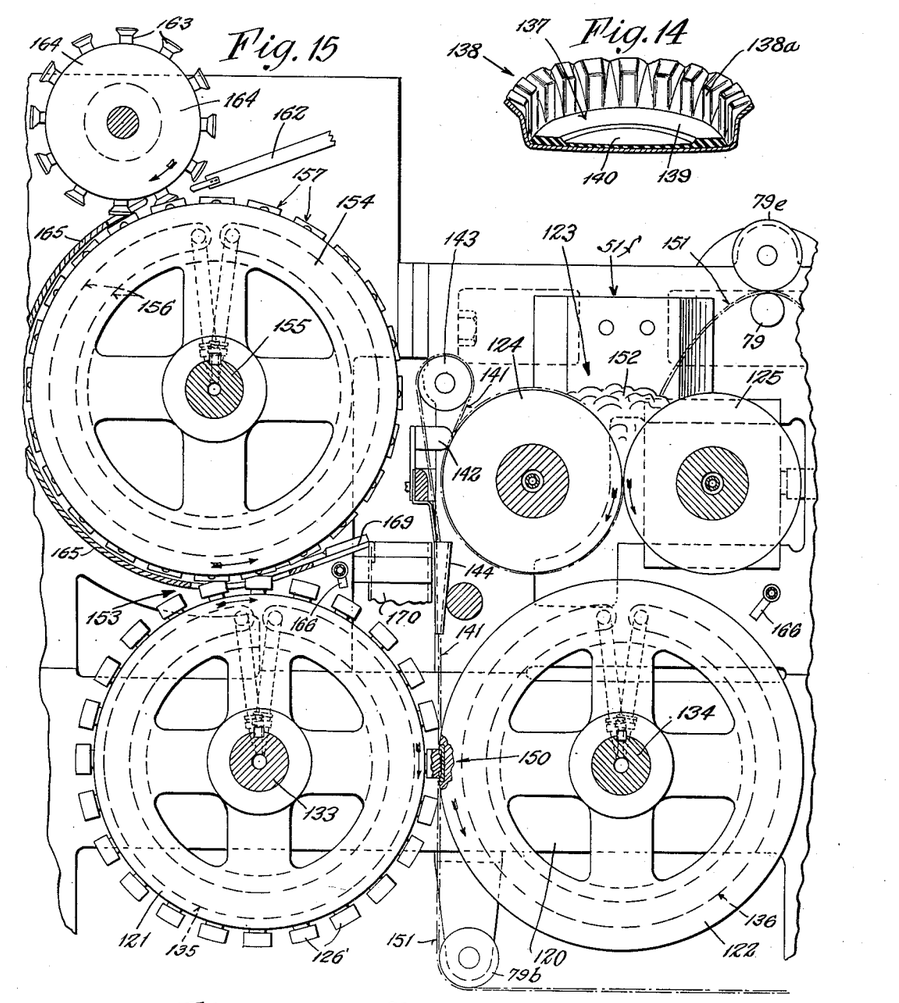
Fig. 14 is an enlarged diametric section of a crown cap having a molded liner made according to the invention.
Fig. 15 is a side elevation of a machine for producing the liner in the crown cap as shown in Fig. 14.

According to the present invention molded liners for crown bottle caps may be advantageously produced, said liners having extremely effective sealing qualities and being produceable with great economy. A cap and molded liner of this type is illustrated in Fig. 14, and a machine for producing these liners in the caps is shown in Figs. 15 through 21.

The machine comprises a frame having side supports 120 on and between the lower portions of which cooperable blanking and molding drums 121 and 122 are rotatably mounted. Above the drum 122 the machine frame carries a warming mill 123 comprising cooperable oppositely rotating milling rollers 124 and 125.

The drums 121 and 122 respectively carry cooperable die elements 126 and 127 mounted equidistant along their peripheries, the elements 126 being carried on shanks 128 backed by screws 129 threaded into the drum 121 so that the die elements may be advanced for adjustment. For maintaining the adjusting screws 129 and die elements 126 in their adjusted positions, the drum 121 has lock screws 130 and 131. The die elements 127 are rigidly secured to the periphery of the drum 122 by screws 132, and are preferably nested in the drum periphery as shown to prevent their shifting and loosening.

Heat is supplied to the drums 121 and 122 through their shafts 133 and 134, the heating fluid circulating through the peripheries of the drums along channels 135 and 136 therein, so as to heat the die elements 126 and 127.

The sealing liner 137 of the crown cap 138, as produced in its preferred form by the machine of the invention, has a comparatively thick flat annular sealing portion 139 extending around the inside of the crimped flange of the cap structure 138a, and has a thinner sealing membrane 140 in the center of the cap structure, integral with the sealing portion 139 and closing or damming the opening of the said portion.

The material for the liners 137 is molded between the die elements 126 and 127, and is of plastic moldable rubber-like composition, supplied in the form of a continuous strip 141 peeled from the mill roller 124 at the discharge side of the warming mill as described previously, the strip being cut by knives 142 and passing over a power-driven roller 143 downward through a flat tubular guide 144 to the bight between the drums 121 and 122.

Figures 16, 17, 18, 19, 20, 21, 22:
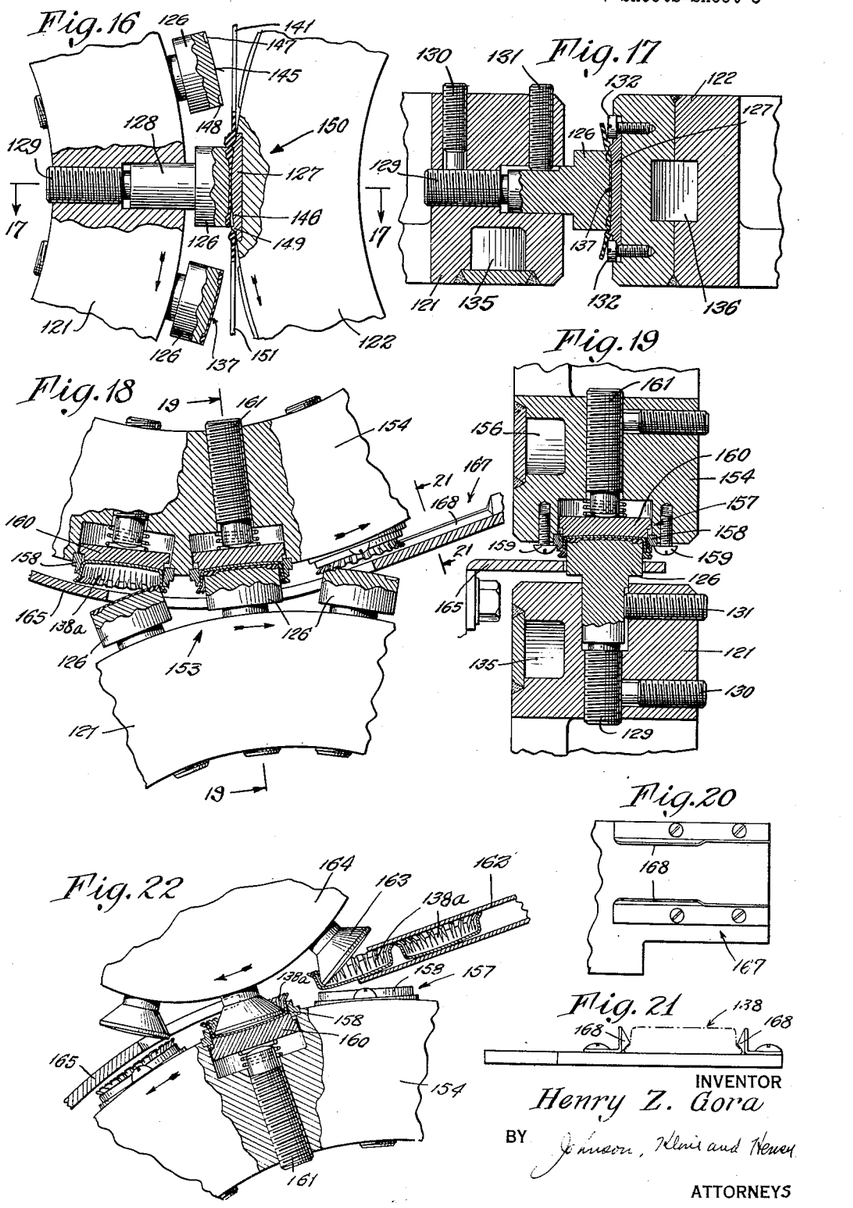
Fig. 16 is a fragmentary enlargement, partly in section and partly in elevation, of adjacent portions of the blanking and molding drums of the machine of Fig. 15.
Fig. 17 is a section taken on the line 17—17 of Fig. 16.
Fig. 18 is a fragmentary enlargement, partly in section and partly in elevation, of adjacent portions of the left-hand molding drum and the cap structure carrying drum of Fig. 15.
Fig. 19 is a section taken on the line 19—19 of Fig. 18.
Fig. 20 is a fragmentary plan view of the stripper for removing the cap and liner assemblies from the cap structure carrying drum.
Fig. 21 is an end elevation of the stripper of Fig. 20.
Fig. 22 is an enlarged view, partly in section and partly in elevation, of the adjacent portions of the cap structure carrying drum and the cap structure feed drum of the machine.

In order to blank measured quantities of material from the strip 141 as the latter is passed between the drums 121 and 122, and to form these quantities, preparatory to their being molded in and to the crown cap structures 138a, the cooperable die elements 126 and 127 have curved faces 145 and 146 respectively. I have found that the surface 145 may be spherical, and the surface 146 may be a surface of revolution, generated by moving an arc of a circle about an axis perpendicular to the axis of the circle and located outside, but in the plane of the latter. In other words, the surface 146 would appear convex in a vertical section taken through the die element 127 as shown in Fig. 16, and would appear concave in a horizontal section taken through the die element, as shown in Fig. 17.

The diameters of the die elements 126 are the same as the outside diameter of the sealing liner 137 in the crown cap, and an annular cavity 147 having sloping or beveled sides is provided in each die surface 145, extending along the periphery of the element so that the outer wall 148 of the cavity forms a substantially sharp cutting ring. Each die element 127 has an annular shoulder or bead 149 large enough in diameter to receive and closely confine succeeding portions of the cutting ring 148 of the die element 126 when the elements are in cooperable relation at the molding station 150 during rotation of the drums. The configuration of the bead 149 is such that it cannot enclose all parts of the cutting ring 148 at any one time, due to the curvature of the faces of the die elements, but instead the enclosure begins at the leading edges of the elements as they reach the molding station 150, and as the elements pass through the station, the enclosure points traverse the die surfaces to the trailing edges of the elements.

The cutting ring 148 thus cooperates with the bead 149 so that the moldable strip 141 passing between the drums 121 and 122 has substantially circular blanks cut from it. These blanks while being cut at the molding station are subjected to heat and pressure, and are molded into the form of the circular disks or liners 137, each having a slight spherical convexity on its plain side, conforming to that of the surfaces 145 of the die elements 126. During the molding operation the excess material of the blanks cut from the strip 141 may be rolled or forced out under pressure at the tops or trailing edges of the die elements as the latter complete the molding operation.

The uncured blanked-out strip 151 leaving the molding station 150 is brought vertically downward so as to immediately depart from the drums 121 and 122, and is passed over suitable rollers and fed back into the warming mill 123 at the input side thereof, to replenish the supply of material 152 in the mill and be utilized subsequently in forming additional liners 137. The molding drum 121 is maintained hotter than the drum 122 preferably, so that the molded liners 137 adhere to the die elements 126 and are carried around on the periphery of the drum 121. The heat to which the formed liners 137 are subjected during the molding operation and while being carried on the periphery of the drum 121, together with the length of time the liners are so heated is not sufficient to cure or vulcanize the latter since, as will be subsequently brought out, the liners are transferred from the drum before it completes one revolution.

According to the present invention means are provided for presenting the crown cap structures 138a consecutively to a second station 153 on the drum 121, for the purpose of molding and adhering the sealing liners 137 to the structures. Accordingly, a third drum 154 is provided, rotatably mounted between the side structures 120 of the machine frame, the drum being carried by a shaft 155 bored to receive heating fluid, and having an annular channel 156 within its periphery through which the fluid circulates for heating the latter. On the periphery of the drum 154 is a row of equi-spaced cap holders 157, each holder comprising a ring 158 secured to the drum by screws 159, and comprising a spring-urged plunger 160 extendable partly through the ring 158, the said plungers being backed when in retracted position by radially located adjusting screws 161 in the drum.

Cap structures 138a are fed one at a time to the cap holders 157 of the drum 154 by means of a chute 162. The caps at the end of the chute are engaged by presser or transfer members 163 and consecutively transferred to the holders 157, the said presser members being rigidly secured to and projecting from the periphery of a rotatable drum 164 located above the drum 154.

The drums 121, 122, 154 and 164 are rotated at such relative speeds that the curvilinear speeds of the die elements 126, 127, cap structure holders 157 and presser members 163 are all equal, and are equal to the peripheral speed of the warming mill roller 124 and pull roller 143, and the directions of rotation of the drums and rollers are indicated by the arrows in Fig. 15.

The chute 162 is closed at the top, except for the discharge end, to maintain the cap structures in flat, inverted position as they are fed down the chute and to the holders 157. The cap structures 138a may be fed to the chute 162 by hand, or by any suitable type of hopper or magazine.

During the operation of placing the cap structures 138a in the rings 158 by the members 163, the plungers 160 are depressed a slight extent and tilted as permitted by their limited bearing surfaces, this occurring especially while the leading and trailing portions of the members 162 are passing the center line of the drums 154 and 164.

A guide rail 165 extends along the periphery of the drum 154 so as to insure the cap structures remaining in the holders 157 while traveling to the station 153.

The cap structures 138a in the holders 157, and the formed liners 137 carried by the die elements 126 are paired or brought together consecutively at the station 153, as shown in Fig. 18, and the liners pressed into and molded against the inside surfaces of the structures so as to be securely adhered thereto. During the molding of the liners to the cap structures, the plungers 160 are unyieldingly backed up by the screws 161 so that substantial molding pressures are had between the die elements 126 and the plungers 160, and the latter being capable of rocking or tilting slightly due to the short bearing surfaces, align with the elements 126, and thereby align the cap structures 138a with the elements so as to prevent undesirable unequal deformation of the liners 137 being molded and transferred.

Preferably the die elements 126 and 127 are moistened with a suitable molding lubricant supplied through nozzles 166 as the drums 121 and 122 rotate, and the cap structures 138a are maintained hotter than the elements 126 so that the liners 137 when molded and adhered to the structures are retained therein.

At the station 153 a stripper 167 is provided, comprising a pair of rails 168 having sloping inner surfaces forming between them a dovetail slot for engagement with the flared crimped flanges of the cap structures 138a, thereby to positively remove the latter from the holders 157 after molding of the sealing liners 137 therein and during further rotation of the drum 154. The stripper 167 is combined with a guide 169 which guides the lined caps 138 to a chute 170 carried by the machine frame. From the chute 170 the caps may be deposited on a suitable conveyor and passed through a vulcanizing oven for vulcanization of the liners 137 thereof, as already described in connection with the molded pieces 55.

It will be readily apparent therefore by the present invention there is provided an improved, extremely economical method and apparatus for producing efficient molded sealing liners in crown caps by a continuous rapid process, and without any waste of the moldable material used in forming the liners.

Figures 24, 25:
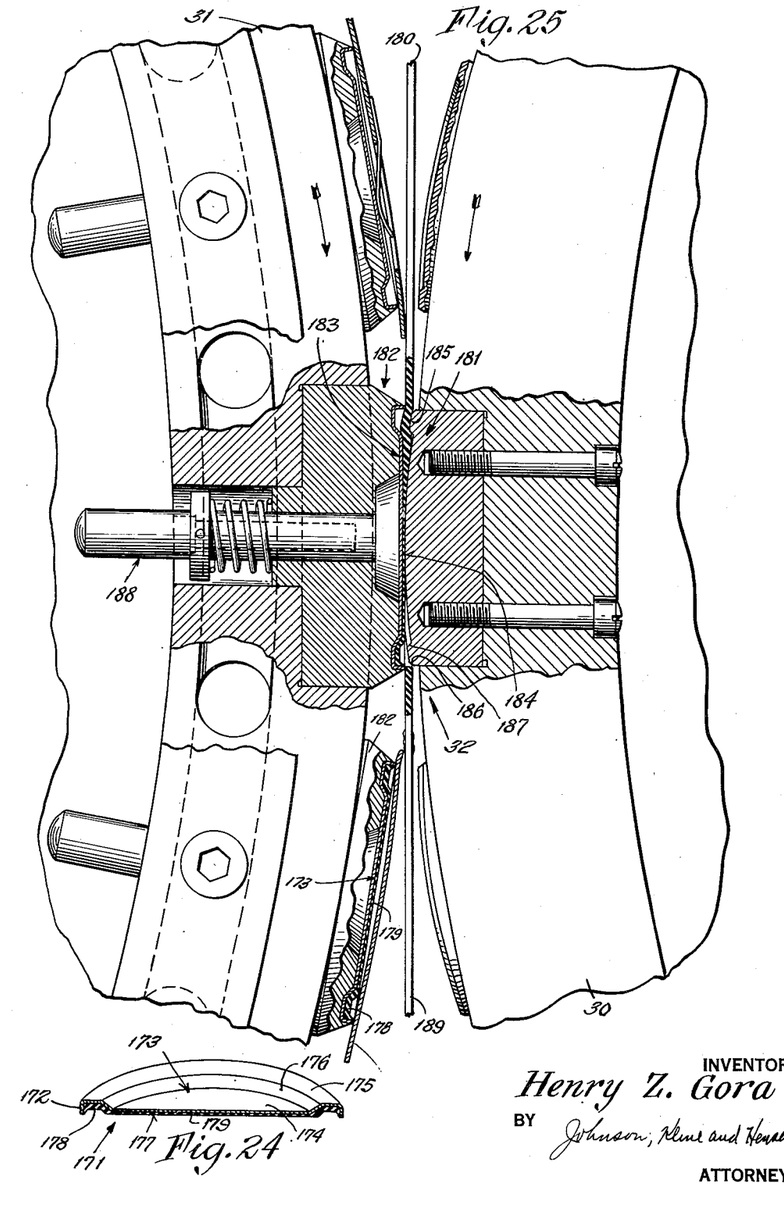
Fig. 24 is a diametric section of a jar lid having a molded liner made according to the invention.
Fig. 25 is a fragmentary view, partly in elevation and partly in section, of adjacent portions of the blanking and molding drums with the die elements employed to produce the lined lid of Fig. 23.

According to this invention, economical and efficient molded sealing liners may be provided in jar lids, such as for instance the lid 171 having a substantially smooth depending flange shown in Fig. 24, and this may be advantageously done by use of the machine shown in Figs. 1 and 2, having molding drums and die elements as illustrated in Fig. 25.

In the case of structural elements such as the crown caps 138 which have deep flanges or crimped flanges presenting an uneven edge, it is not feasible to blank, mold, and adhere the liner to the cap structure simultaneously and at one station in the machine. However, where structures are to be lined which have comparatively shallow flanges not crimped but of even and smooth contour, such as the flange 172 of the lid structure 173 of Fig. 24, the lid structure may be advantageously utilized in the blanking and molding operations, and simultaneously the gasket or liner formed thereby may be molded against and adhered to the underside of the structure, all at one station in the machine, thereby simplifying the equipment.

Illustrative of one embodiment of the invention, the lid structure 173 is shown as comprising a central flat disk-like body portion 174 integral with a surrounding flat annular jar-engaging portion 175, these two portions being connected by a sloping wall or shoulder 176. The jar-engaging portion 175 of the structure has along its outer edge the shallow depending flange 172 of smooth or even contour.

The underside of the lid structure 173 is completely covered by a sealing liner 177 having an annular comparatively thick sealing portion 178 extending adjacent the annular portion 175 of the structure and located between the flange 172 and wall 176 thereof. Integral with the sealing portion 178 of the liner is a comparatively thin membranous portion 179 closing over the area encircled by the portion 178, and covering the underside of the disk-like body 174 of the cap structure.

The gasket or liner 177 is formed and molded directly against the underside of the lid structure 173, according to the present invention, and the material for the gasket is provided in the form of a continuous strip 180 supplied from a warming mill.

In accomplishing this, the cooperable drums 30 and 31 of the molding machine are provided respectively with sets of die elements 181 and 182, Fig. 25, mounted at equi-spaced intervals along their peripheries. The elements 182 are circular and have recessed faces 183 adapted to nest and to hold the lid structures 173, these structures being deposited one at a time in the elements or holders 182 at a convenient point, such as the top of the drum, by any suitable well-known means. The die elements 181 are also circular, being rigidly secured to the drum 30 and preferably nested in the periphery thereof for purposes of firm anchorage, and said elements have convex faces 184 of such curvature that predetermined spaces exist between the said faces and the undersides of the lid structures 173 during the cooperable movements of the elements 181 and 182 past the molding station 32.

The surface 184 of the die element 181 has a circular ridge or bead 185 encircling it, the outer edge of the bead being beveled at 186 and adapted to cooperate with the flange 172 of the nested lid structure so as to shear or blank a disk-like portion from the continuous moldable strip 180 as the latter is fed between the drums 30 and 31 at the station 32. The inner edge 187 of the bead 185 is also beveled as shown, and the surface 184 of the die element 181 is curved in such a manner that during the blanking of the moldable strip 180 at the molding station, the blanked portion is formed to the exact shape of the sealing liner 177, being molded against and adhered to the undersurface of the lid structure 173 by a rolling operation somewhat similar to a calendering operation.

The material of the blank which is cut from the strip 180 is made to flow and to completely progressively fill the space existing between the die surface 184 and the undersurface of the lid structure 173, as these latter progress past the molding station 32, thereby to produce the portions 178 and 179 of different thickness in the liner 177.

To facilitate the molded liner 177 adhering to the undersurface of the lid structure 173, the latter is preferably hotter than the surface 184 of the die element 181.

The elements or holders 182 are centrally bored and countersunk to receive spring-urged plungers 188 which when projected subsequent to the molding of the liners in the cap structures 173, eject the latter from the holders 182. The lined structures may then be further processed, where this is desired, to vulcanize the liners at another place in the machine, as in the manner already described.

The blanked or perforated remainder 189 of the moldable strip 180 is fed back into the warming mill from which it was stripped, in a manner as already described above, thereby to enable the moldable material to be utilized over and over again, so as to ultimately all become useful product.

Thus, according to the present invention, molded liners having highly efficient sealing qualities may be provided on the undersides of jar lid structures in a very economical manner without waste of the moldable material, and by a rapid, continuous process in which the liners are blanked, molded and adhered to the said structures at a single station in the machine, using the lid structures in cooperation with the blanking and forming die elements.

Variations and modifications may be made within the scope of this invention and portions of the improvements may be used without others.

I claim:

1. The method of continuously molding and hardening material which comprises continuously forming a strip of plastic material having a predetermined thickness and passing said strip through a blanking and molding zone of substantially fixed extent at a speed of travel providing a predetermined molding period, successively blanking out articles from said strip in said zone and subjecting said blanked out articles to a molding pressure during passage through said zone sufficient to modify the cross-sectional configuration of said blanks to substantially that of the finished articles, successively releasing the molded unhardened articles from said molding pressure, and continuously passing said molded articles free of molding pressure through a hardening zone of substantially fixed extent at a speed independent of the speed of said blanks through said molding zone to provide a predetermined hardening period for hardening the molded articles in sequence with but unlimited by said molding period.

2. The method of continuously molding and hardening material which comprises plasticizing a batch of material, continuously forming a strip of predetermined thickness from said material, continuously passing said strip through a blanking and molding zone of substantially fixed extent at a speed of travel providing a predetermined molding period, successively blanking out articles from said strip and subjecting the blanked out articles to a molding pressure during passage through said zone sufficient to modify the cross-sectional configuration thereof to substantially that of the finished articles, releasing the molded unhardened articles from said molding pressure and passing said molded articles free of molding pressure through a hardening zone of substantially fixed extent at a speed independent of the speed through said molding zone to provide a predetermined period of hardening the molded articles in sequence with but unlimited by said molding period.

3. The method of continuously molding and hardening material which comprises plasticizing a batch of material, continuously forming a strip of predetermined thickness from said material, continuously passing said strip through a blanking and molding zone of substantially fixed extent at a speed of travel providing a predetermined pressure molding period, successively blanking out articles from said strip and subjecting the blanked out articles to a molding pressure during passage through said zone sufficient to modify the cross-sectional configuration thereof to substantially that of the finished articles, releasing the molded unhardened articles from said molding pressure, collecting the separate articles, and passing the separate articles in loose discrete form free of molding pressure through a hardening zone having an atmosphere heated to curing temperatures at a speed determined by the hardening-time requirements and independently of the molding-time requirements of said molded articles.

4. The method of continuously molding and curing material which comprises plasticizing a batch of material, continuously separating a strip of predetermined thickness from said plasticized material, continuously passing said strip through a blanking and molding zone of substantially fixed extent at a speed of travel providing a predetermined pressure molding period, successively blanking out articles from said strip and subjecting the blanked out articles to a sufficient molding pressure during the molding period to modify the cross-sectional configuration thereof to substantially that of the finished articles, releasing the molded uncured articles from said molding pressure, passing said molded articles in loose discrete form free of molding pressure through a curing zone of substantially fixed extent at a speed independent of the speed through said molding zone to provide a predetermined curing period for hardening the molded articles in sequence with said molding period but unlimited thereby, and reincorporating the skeletonized strip of uncured material in said original batch.

5. The method of continuously molding and curing material which comprises plasticizing a batch of uncured material between plasticizing rolls to form a continuous layer of predetermined thickness around one of said rolls, continuously separating a strip of said uncured material from said sheet, continuously passing said strip through a blanking and molding zone of substantially fixed extent at a speed to provide a predetermined pressure molding period, successively blanking out articles from said strip and subjecting said blanked out articles to a sufficient molding pressure during the molding period to flow the material and modify the cross-sectional configuration thereof to substantially that of the finished articles, releasing the molded uncured articles from said molding pressure, passing said molded articles unconfined and free of molding pressure through a curing zone at a speed determined by the hardening-time requirements and independently of the molding-time requirements of said molded articles, and returning the skeletonized strip of uncured material to said batch at a point spaced from the surfaces of said plasticizing rolls.

6. The method which comprises forming a strip of plastic material having a predetermined thickness and continuously passing said strip through a blanking and molding zone of substantially fixed extent at a speed of travel providing a predetermined molding period, successively blanking pieces from said strip in said zone and simultaneously pressing said blanked out pieces into engagement with a structural element under a molding pressure during passage through said molding zone sufficient to modify the cross-sectional configuration of said blanked out pieces to substantially that of the finished article and bond said article to said structural element, successively releasing the resulting composite product from said molding pressure, and continuously passing said composite products free of molding pressure through a hardening zone independent of the speed thereof through said molding zone to provide a predetermined hardening period for hardening the plastic material in sequence with but unlimited by said molding period.

7. A machine for continuously molding and hardening plastic material comprising in combination, means for forming a continuous strip of plastic material, a series of cooperating article blanking and molding dies movable through a molding zone of substantially fixed length, means for continuously feeding said strip through said zone between said dies, means for operating said dies to successively blank out portions from said strip and subject said blanked out portions to a molding pressure sufficient to modify the cross-sectional configuration thereof to substantially that of the finished articles, means for releasing said molded unhardened articles from the molding pressure, means forming a hardening zone of substantially fixed length, and means for continuously passing said molded articles free of molding pressure through said hardening zone at a speed independent of the speed of travel of said blanks through said molding zone.

8. A machine for continuously molding and hardening plastic material comprising in combination, means for forming a continuous strip of plastic material, a series of cooperating article blanking and molding dies movable through a molding zone of substantially fixed length, means for continuously feeding said strip through said zone between said dies, means for operating said dies to successively blank out portions from said strip and subject said blanked out portions to a molding pressure sufficient to modify the cross-sectional configuration thereof to substantially that of the finished articles, means for releasing said molded unhardened articles from the molding pressure, means including a chamber having an atmosphere heated to curing temperatures forming a hardening zone of substantially fixed length, and means for continuously passing said molded articles free of molding pressure through said hardening zone at a speed independent of the speed of travel of said blanks through said molding zone.

9. A machine for continuously molding and hardening plastic material comprising in combination, means for forming a continuous sheet of plastic material; means for cutting from said sheet a continuous strip of plastic material, a series of cooperating article blanking and molding dies movable through a molding zone of substantially fixed length, means for continuously feeding said strip through said zone between said dies, means for operating said dies to successively blank out portions from said strip and subject said blanked out portions to a molding pressure sufficient to modify the cross-sectional configuration thereof to substantially that of the finished articles, means for discharging said molded unhardened articles from said dies, means including a source of heat forming a hardening zone of substantially fixed length, and means for continuously passing said molded articles in loose discrete form free of molding pressure through said hardening zone at a speed determined by the hardening-time requirements of the molded articles independently of the molding-time requirements.

10. A machine comprising in combination, cooperating blanking and molding dies movable through a molding zone of substantially fixed length, means for positioning non-plastic structural elements in said dies, means for continuously feeding a strip of moldable material through said zone between said dies, means for operating said dies to blank out portions of said strip and assemble said blanked out portions with said structural elements and subject the composite articles to a molding pressure sufficient to modify the cross-sectional configuration of the blanked out portions and adhere them to said elements, means for releasing the composite articles from the molding pressure, and means for passing said articles through a hardening zone of substantially fixed length at a speed independent of their travel through said molding zone.

11. The method which comprises forming a strip of plastic material having a predetermined thickness and continuously passing said strip through a blanking and molding zone of substantially fixed extent at a speed of travel providing a predetermined molding period, successively blanking pieces from said strip in said zone and simultaneously pressing each blanked out piece into engagement with a structural element under a molding pressure during passage through said zone sufficient to modify the cross-sectional configuration of said blanked out pieces to substantially that of the finished article and bond said article to said structural element, and successively releasing the resulting composite products from said molding pressure.

12. A machine comprising in combination, cooperating blanking and molding dies movable through a molding zone of substantially fixed length, means for positioning structural elements in cooperative relation with said dies, means for continuously feeding a strip of moldable material through said zone between said cooperating dies, means for operating said dies to blank out portions of said strip and assemble said blanked out portions with said structural elements and simultaneously subject each of the composite articles to a molding pressure sufficient to modify the cross-sectional configuration of the blanked out portions and adhere them to said elements, and means for releasing the composite articles from the molding pressure.

13. In the process of making pieces of vulcanizable material, the steps of milling between mill rollers a bank of plastic vulcanizable molding material until one of the mill rollers has an enveloping surface layer of plasticized material of the desired degree of plasticity and of predetermined thickness, cutting from part of the layer intermediate the edges thereof on the mill roller a continuous ribbon of plasticized material slightly wider than the piece to be made, the gap thus formed in the layer being continuously filled by the distribution of the bank between the mill rollers, guiding said ribbon to a blanking zone, there passing the ribbon between punch and die elements to cut pieces of desired shape from the ribbon, removing the cut pieces from the ribbon, guiding the skeletonized ribbon from which the pieces have been cut back to the mill rollers to commingle with the bank of material therein, and adding to the bank fresh vulcanizable material to replenish the bank as the pieces are being made.

14. In the process of making and molding pieces of vulcanizable material, the steps of milling between mill rollers a bank of plastic vulcanizable molding material until one of the mill rollers has an enveloping surface layer of plasticized material of the desired degree of plasticity and of predetermined thickness, cutting from part of the layer intermediate the edges thereof on the mill roller a continuous ribbon of plasticized material slightly wider than the piece to be made, the gap thus formed in the layer being continuously filled by the distribution of the bank between the mill rollers, guiding the ribbon to a blanking zone, there passing the ribbon between punch and molding die elements and operating said die elements to cut pieces from the ribbon and mold them to desired shape and size, removing the cut pieces from the ribbon, discharging the cut and molded pieces, guiding the skeletonized ribbon from which the pieces have been cut back to the mill rollers to commingle with the bank of material therein, and adding to the bank fresh vulcanizable material to replenish the bank as the pieces are being made.

15. In the process of making pieces of vulcanized material, the steps of milling between mill rollers a bank of plastic vulcanizable molding material until one of the mill rollers has an enveloping surface layer of plasticized material of the desired degree of plasticity and of predetermined thickness, cutting from part of the layer intermediate the edges thereof on the mill roller a continuous ribbon of plasticized material slightly wider than the piece to be made, the gap thus formed in the layer being continuously filled by the distribution of the bank between the mill rollers, guiding the ribbon to a blanking zone, there passing the ribbon between punch and molding die elements to cut pieces from the ribbon and mold them to desired shape and size, removing the cut pieces from the ribbon, guiding the skeletonized ribbon from which the pieces have been cut back to the mill rollers to commingle with the bank of material therein, adding to the bank fresh vulcanizable material to replenish the bank as the pieces are being made, discharging the cut and molded pieces from the punch and die elements, and subjecting the molded pieces to vulcanizing temperatures after they have been discharged from the punch and die elements.

16. In the process of making pieces of vulcanizable material, the steps of milling between mill rollers a bank of plastic vulcanizable molding material until one of the mill rollers has an enveloping surface layer of plasticized material of the desired degree of plasticity and of predetermined thickness, cutting from part of the layer intermediate the edges thereof on the mill roller a continuous ribbon of plasticized material slightly wider than the piece to be made, the gap thus formed in the layer being continuously filled by the distribution of the bank between the mill rollers, guiding said ribbon to a blanking zone, there passing the ribbon between punch and die elements to cut out pieces of desired shape from the ribbon, pressing each of said cut-out pieces into engagement with a structural element under a molding pressure sufficient to modify the cross-sectional configuration of said cut-out pieces to substantially that of the finished article and bond said article to said structural element, guiding the skeletonized ribbon from which the pieces have been cut back to the mill rollers to commingle with the bank of material therein, and adding to the bank fresh vulcanizable material to replenish the bank as the pieces are being made.

17. A machine comprising in combination a rotary carrier, a row of article-supporting and positioning means mounted on said carrier and traveling by the rotation thereof in a circular path, means for guiding a continuous strip of plastic moldable material along a part of the path of travel of said article-positioning means, die mechanism including a plurality of blanking and molding heads, and means supporting said molding heads for movement relative to said article-positioning means to cause said heads to successively penetrate said strip and simultaneously mold successive portions thereof to successive articles in said supporting means.

HENRY Z. GORA.

REFERENCES CITED

The following references are of record in the file of this patent:

UNITED STATES PATENTS

| Number | Name | Date |
|---|---|---|
| Re. 19,536 | Parks | Apr. 16, 1935 |
| 492,206 | Hunter et al. | Feb. 21, 1893 |
| 538,223 | Cummings | Apr. 23, 1895 |
| 1,238,980 | Barbieri | Sept. 4, 1917 |
| 1,424,920 | Kintzele et al. | Aug. 8, 1922 |
| 1,501,492 | Kmentt | July 15, 1924 |
| 1,619,210 | MacLaren | Mar. 1, 1927 |
| 1,693,264 | Waner | Nov. 27, 1928 |
| 1,743,302 | Allen | Jan. 14, 1930 |
| 1,750,708 | Edwards | Mar. 18, 1930 |
| 1,905,663 | Wallace | Apr. 25, 1933 |
| 1,930,736 | Burrell | Oct. 17, 1933 |
| 1,944,464 | Richardson | Jan. 23, 1934 |
| 1,948,344 | Fischer | Feb. 20, 1934 |
| 2,023,665 | Clayton | Dec. 10, 1935 |
| 2,103,860 | Mazzeo | Dec. 28, 1937 |
| 2,112,513 | Abbott, Jr. et al. | Mar. 29, 1938 |
| 2,160,312 | Karthaus | May 30, 1939 |
| 2,166,490 | Gora | July 18, 1939 |
| 2,181,737 | North | Nov. 28, 1939 |
| 2,200,262 | Daley et al. | May 14, 1940 |
| 2,264,237 | Brown | Nov. 25, 1941 |
| 2,288,611 | DeWyk | July 7, 1942 |
| 2,318,533 | Selvig | May 4, 1943 |
| 2,319,040 | Conklin | May 11, 1943 |
| 2,350,971 | Pecker et al. | June 6, 1944 |
| 2,456,697 | Gruenwald | Dec. 21, 1948 |
| 2,463,288 | Leguillon | Mar. 1, 1949 |

OTHER REFERENCES

Plastics in Engineering, by Delmonte, pub. by Penton Pub. Co., 1940, Machine Design Series, page 341.